United States Patent
Alexander

(12) 
(10) Patent No.: US 6,276,582 B1
(45) Date of Patent: Aug. 21, 2001

(54) ITEM RESTRAINT DEVICE FOR VEHICLE SEATS

(76) Inventor: Linda Maya Alexander, 7667 Hyssop Dr., Rancho Cucamonga, CA (US) 91739

(*) Notice: Subject to any disclaimer, the term of this patent is extended or adjusted under 35 U.S.C. 154(b) by 0 days.

(21) Appl. No.: 09/645,768

(22) Filed: Aug. 25, 2000

(51) Int. Cl.⁷ ........................................ B60R 7/04
(52) U.S. Cl. .......................... 224/275; 217/16; 220/6; 224/498
(58) Field of Search ................ 217/16, 48; 224/275, 224/497, 498, 314, 539, 542; 220/6

(56) References Cited

U.S. PATENT DOCUMENTS

| | | | |
|---|---|---|---|
| 655,244 | * 8/1900 | Kesting | 220/6 |
| 1,158,885 | * 11/1915 | Beck | 220/6 |
| 1,179,445 | * 4/1916 | Manning | 224/539 |
| 2,051,265 | * 8/1936 | Martin | 224/539 |
| 2,654,498 | * 10/1953 | Jennison | 220/6 |
| 2,777,625 | * 1/1957 | Kronhaus et al. | 224/539 |
| 4,131,313 | * 12/1978 | Jacobs | 224/275 |
| 4,714,013 | * 12/1987 | Telfer | 220/6 |
| 6,056,177 | * 5/2000 | Schneider | 224/542 |
| 6,135,332 | * 10/2000 | Eleam | 224/275 |
| 6,149,025 | * 11/2000 | Wang | 220/6 |

* cited by examiner

Primary Examiner—Stephen P. Garbe
(74) Attorney, Agent, or Firm—Joseph N. Breaux

(57) ABSTRACT

An item restraint device for vehicle seats that is securable to a vehicle seat and that includes a compartment for holding one or more items to prevent the items from sliding off of the vehicle seat while driving. The item restraint device is collapsible to allow it to be stored under the seat, in a pocket on the backrest of the seat or other suitable location within the passenger compartment of the vehicle. The item restraint device includes a collapsible item restraint enclosure and a seat attachment strap assembly.

1 Claim, 3 Drawing Sheets

TOP VIEW, FOLDED

ITEM RESTRAINT DEVICE FOR VEHICLE SEATS

TECHNICAL FIELD

The present invention relates to restraint devices for vehicles and more particularly to an item restraint device for vehicle seats that includes a collapsible item restraint enclosure and a seat attachment strap assembly; the collapsible item restraint enclosure being constructed from a sidewall assembly and a fabric bottom section; the sidewall assembly being formed from eight rectangular boards covered with a fabric material and connected together such that eight flexible joints forming a continuous ring are created; the fabric bottom section is connected to a bottom perimeter edge of the fabric material covering the eight rectangular boards to form a continuous floor for the sidewall assembly; the collapsible item restraint enclosure being configured into a collapsed configuration for storage and an open box configuration for use in restraining items within a storage compartment defined by the interior surface of the fabric material covering the eight rectangular boards and the fabric bottom section; the seat attachment strap assembly including two straps each secured an opposed side of the sidewall assembly such that three flexible joints are positioned between the two straps and each strap extends away from the sidewall assembly and has a fastener provided at the far end thereof that is adjustably fastenable to the fastener provided at the far end of the other strap such that the collapsible item restraint enclosure is secured to a vehicle seat by securing the two straps around a backrest portion of the vehicle seat while the collapsible item restraint enclosure is supported on the seat portion of the vehicle seat.

BACKGROUND ART

It is often necessary to carry multiple items on a vehicle seat. Although the weight of the items act to keep the items on the seat, sudden stops and/or turns can cause the items to fly off of the seat—distracting the driver temporarily and causing a dangerous situation. It would, therefore, be desirable to have an item restraint device for vehicle seats that can be secured to a vehicle seat and that includes a compartment for holding one or more items to prevent the items from sliding off of the vehicle seat while driving. Because the item restraint device would not be needed all of the time, it would be further desirable to have an item restraint device that was collapsible to allow it to be stored under the seat, in a pocket on the backrest of the seat or other suitable location within the passenger compartment of the vehicle.

GENERAL SUMMARY DISCUSSION OF INVENTION

It is thus an object of the invention to provide an item restraint device for vehicle seats that includes a collapsible item restraint enclosure and a seat attachment strap assembly; the collapsible item restraint enclosure being constructed from a sidewall assembly and a fabric bottom section; the sidewall assembly being formed from eight rectangular boards covered with a fabric material and connected together such that eight flexible joints forming a continuous ring are created; the fabric bottom section is connected to a bottom perimeter edge of the fabric material covering the eight rectangular boards to form a continuous floor for the sidewall assembly; the collapsible item restraint enclosure being configured into a collapsed configuration for storage and an open box configuration for use in restraining items within a storage compartment defined by the interior surface of the fabric- material covering the eight rectangular boards and the fabric bottom section; the seat attachment strap assembly including two straps each secured an opposed side of the sidewall assembly such that three flexible joints are positioned between the two straps and each strap extends away from the sidewall assembly and has a fastener provided at the far end thereof that is adjustably fastenable to the fastener provided at the far end of the other strap such that the collapsible item restraint enclosure is secured to a vehicle seat by securing the two straps around a backrest portion of the vehicle seat while the collapsible item restraint enclosure is supported on the seat portion of the vehicle seat.

Accordingly, an item restraint device for vehicle seats is provided. The item restraint device for vehicle seats includes a collapsible item restraint enclosure and a seat attachment strap assembly; the collapsible item restraint enclosure being constructed from a sidewall assembly and a fabric bottom section; the sidewall assembly being formed from eight rectangular boards covered with a fabric material and connected together such that eight flexible joints forming a continuous ring are created; the fabric bottom section is connected to a bottom perimeter edge of the fabric material covering the eight rectangular boards to form a continuous floor for the sidewall assembly; the collapsible item restraint enclosure being configured into a collapsed configuration for storage and an open box configuration for use in restraining items within a storage compartment defined by the interior surface of the fabric material covering the eight rectangular boards and the fabric bottom section; the seat attachment strap assembly including two straps each secured an opposed side of the sidewall assembly such that three flexible joints are positioned between the two straps and each strap extends away from the sidewall assembly and has a fastener provided at -the far end thereof that is adjustably fastenable to the fastener provided at the far end of the other strap such that the collapsible item restraint enclosure is secured to a vehicle seat by securing the two straps around a backrest portion of the vehicle seat while the collapsible item restraint enclosure is supported on the seat portion of the vehicle seat.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
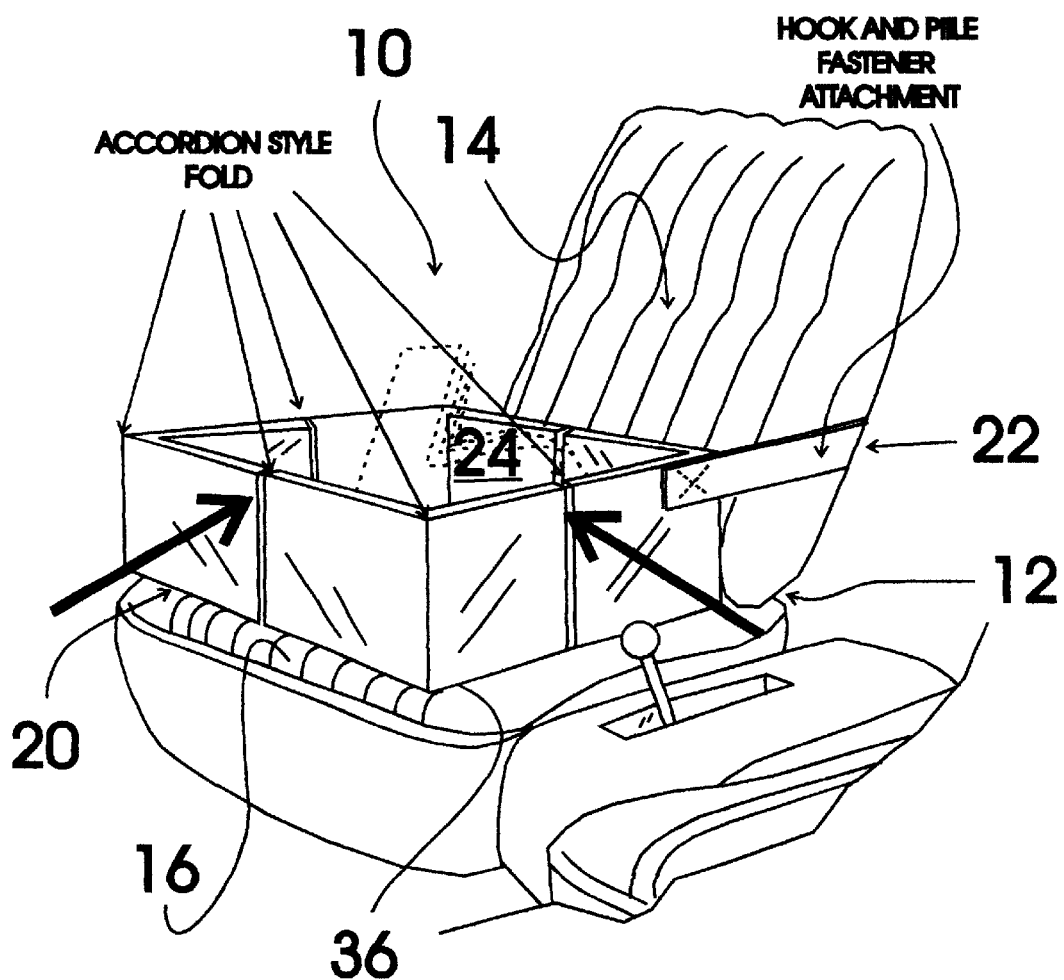
FIG. 1 is a perspective view of an exemplary embodiment of the item restraint device for vehicle seats of the present invention showing the collapsible item restraint enclosure and the seat attachment strap assembly; the collapsible item restraint enclosure being constructed from a sidewall assembly and a fabric bottom section; the sidewall assembly being formed from eight rectangular boards covered with a fabric material and connected together such that eight flexible joints forming a continuous ring are created; the fabric bottom section is connected to a bottom perimeter edge of the fabric material covering the eight rectangular boards to form a continuous floor for the sidewall assembly; the collapsible item restraint enclosure being configured into a collapsed configuration for storage and an open box configuration for use in restraining items within a storage compartment defined by the interior surface of the fabric material covering the eight rectangular boards and the fabric bottom section; the seat attachment strap assembly including two straps each secured an opposed side of the sidewall assembly such that three flexible joints are positioned between the two straps and each strap extends away from the sidewall assembly and has a fastener provided at the far end thereof that is adjustably fastenable to the fastener provided at the far end of the other strap such that the collapsible item restraint enclosure is secured to a vehicle seat by securing the two straps around a backrest portion of the vehicle seat while the collapsible item restraint enclosure is supported on the seat portion of the vehicle seat.
Figure 2:
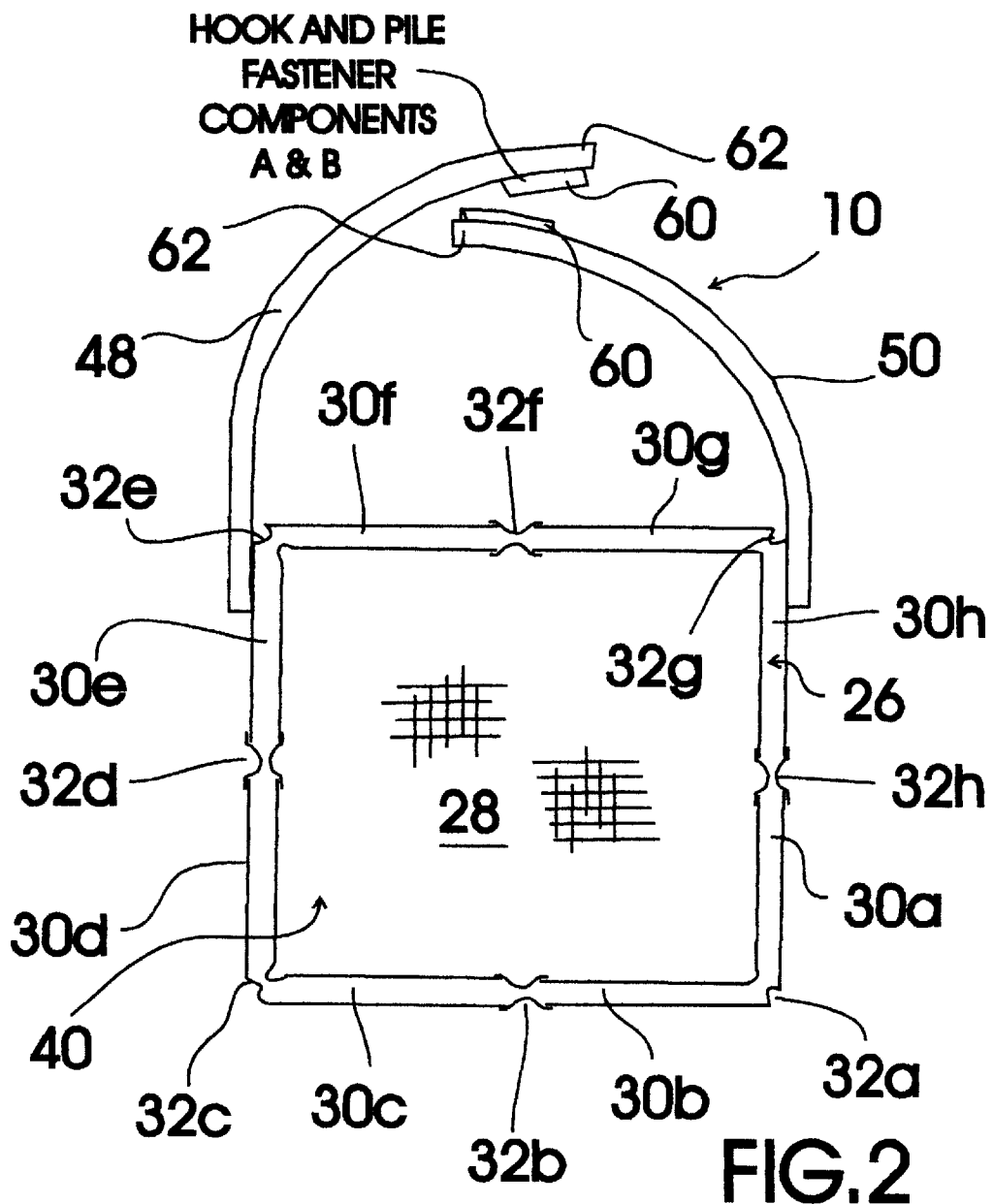
FIG. 2 is a top plan view of the item restraint device for vehicle seats of FIG. 1 in the open box configuration.
Figure 3:
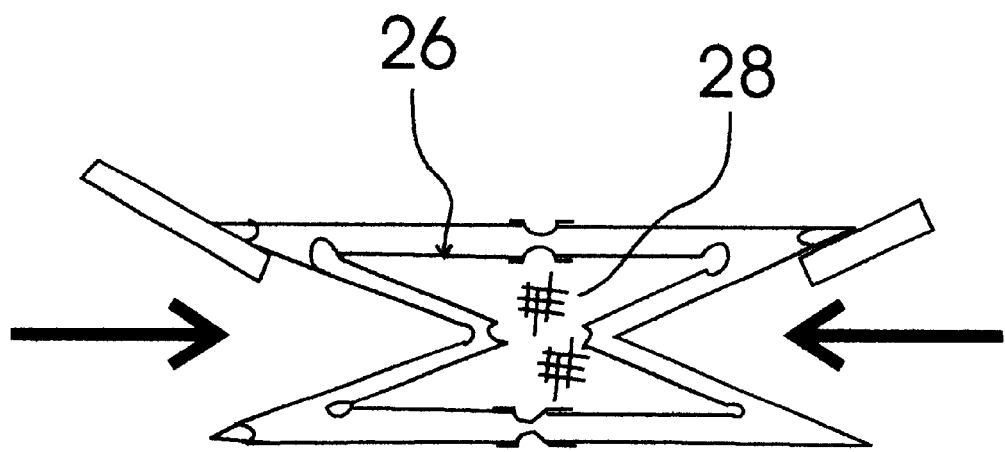
FIG. 3 is a top plan view of the item restraint device for vehicle seats of FIG. 1 in the collapsed configuration.

FIGS. 1–3 show various aspects of an exemplary embodiment of the item restraint, device for vehicle seats of the present invention generally designated 10. Item restraint device for vehicles 10 is adapted for use with vehicle seats, generally designated 12, that include backrest portion 14 and a seat portion 16.

Item restraint device for vehicle seats TO includes a collapsible item restraint enclosure, generally designated 20, and a seat attachment strap assembly, generally designated a Collapsible item restraint enclosure 20 is constructed from a sidewall assembly, generally designated 26, and a fabric bottom section 28. Sidewall assembly 26 is formed from eight rectangular boards 30a–h covered with a fabric material and connected together such that eight flexible joints 32a–h forming a continuous ring arc created. Fabric bottom section 28 is connected to a bottom perimeter edge 36 of the fabric material covering the eight rectangular boards 30a–h to form a continuous floor for the sidewall assembly 26. Collapsible item restraint enclosure 20 is configurable into a collapsed configuration (shown partially collapsed in FIG. 3) for storage and an open box configuration (FIGS. 1 and 2) for use in restraining items within a storage compartment 40 defined by an interior surface 42 of the fabric material covering the eight rectangular boards 30a–h and fabric bottom section 28.

Seat attachment strap assembly 22 includes two straps 48,50. Each strap 48,50 is secured to an opposed side of sidewall assembly 26 such that three flexible joints 32e–g are positioned between them. Each of the two straps 48,50 extends away from the sidewall assembly 26 and has a fastener 60 provided at the far end 62 thereof that is adjustably fastenable to the fastener 60 provided at the far end 62 of the other strap 50,48 such that the collapsible item restraint enclosure 20 is secured to a vehicle seat 12 by securing the two straps 48, 50 around a bat crest portion 14 of vehicle seat 12 while collapsible item restraint enclosure 20 is supported on seat portion 16 of vehicle seat 12.

It can be seen from the preceding description that an item restraint device for vehicle seats has been provided.

It is noted that the embodiment of the item restraint device for vehicle seats described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An item restraint device for vehicle seats that include a seat portion and a backrest portion; said item restraint device for vehicle seats comprising:

a collapsible item restraint enclosure; and a seat attachment strap assembly;

said collapsible item restraint enclosure being constructed from a sidewall assembly and a fabric bottom section;

said sidewall assembly being formed from eight rectangular boards covered with a fabric material and connected together such that eight flexible points forming a continuous ring are created;

said fabric bottom section is connected to a bottom perimeter edge of said fabric material covering said eight rectangular boards to form a continuous floor for said sidewall assembly;

said collapsible item restraint enclosure being configured into a collapsed configuration for storage and an open box configuration for use in restraining items within a storage compartment defined by said interior surface of said fabric material covering said eight rectangular boards and said fabric bottom section;

said seat attachment strap assembly including two straps each secured to an opposed side of said sidewall assembly such that three flexible joints are positioned between said two straps and each strap extends away from said sidewall assembly and has a fastener provided at said far end thereof that is adjustably fastenable to said fastener provided at said far end of said other strap such that said collapsible item restraint enclosure is secured to a vehicle seat by securing said two straps around a backrest portion of a vehicle seat while said collapsible item restraint enclosure is supported on a seat portion of the vehicle seat.

* * * * *